United States Patent
Sung et al.

(10) Patent No.: US 12,416,482 B2
(45) Date of Patent: Sep. 16, 2025

(54) POSITION MEASURING DEVICE AND SUBSTRATE PROCESSING APPARATUS INCLUDING THE SAME

(71) Applicant: SEMES CO., LTD., Cheonan-si (KR)

(72) Inventors: Bo Ram Chan Sung, Anyang-si (KR); Dong Yun Lee, Cheonan-si (KR); Eon Seok Lee, Cheonan-si (KR)

(73) Assignee: SEMES CO., LTD., Cheonan-si (KR)

( * ) Notice: Subject to any disclaimer, the term of this patent is extended or adjusted under 35 U.S.C. 154(b) by 468 days.

(21) Appl. No.: 17/544,961

(22) Filed: Dec. 8, 2021

(65) Prior Publication Data

US 2022/0194107 A1 Jun. 23, 2022

(30) Foreign Application Priority Data

Dec. 21, 2020 (KR) .......................... 10-2020-0180038

(51) Int. Cl.
  *G01B 5/00* (2006.01)
  *B41J 25/00* (2006.01)
  *G01B 11/14* (2006.01)

(52) U.S. Cl.
  CPC ................ *G01B 5/00* (2013.01); *G01B 11/14* (2013.01); *B41J 25/001* (2013.01)

(58) Field of Classification Search
  CPC ....... B41J 25/001; B41J 19/207; G01B 11/14; G01B 3/04; G01B 5/00; G01B 5/004
  USPC ......................................................... 702/158
  See application file for complete search history.

(56) References Cited

U.S. PATENT DOCUMENTS

| | | | |
|---|---|---|---|
| 11,392,042 B2 * | 7/2022 | Shimoyama | ........ G03F 7/70775 |
| 11,410,866 B2 | 8/2022 | Seyama et al. | |
| 2021/0387452 A1 * | 12/2021 | Yasuda | ................ B41J 2/04586 |

FOREIGN PATENT DOCUMENTS

| | | | |
|---|---|---|---|
| CN | 1550333 A | | 12/2004 |
| JP | 2009063437 A | * | 3/2009 |
| KR | 20110035882 A | * | 4/2011 |
| KR | 10-1041876 B1 | | 6/2011 |
| KR | 20120011643 A | * | 2/2012 |
| KR | 10-2012-0029842 A | | 3/2012 |
| KR | 10-2013-0102499 A | | 9/2013 |

(Continued)

OTHER PUBLICATIONS

The Notice of Allowance dated Jan. 6, 2023 of the Korea Patent Application No. 10-2020-0180038, which corresponds to the above-identified application.

(Continued)

*Primary Examiner* — Lisa M Caputo
*Assistant Examiner* — Joshua L Forristall
(74) *Attorney, Agent, or Firm* — Harvest IP Law LLP (57) ABSTRACT

A position measuring device and a position measuring method for accurately measuring a position of a movable member using a plurality of linear scales are provided. The position measuring device comprises a first linear scale elongated in a first direction, a second linear scale elongated in the first direction and separated from the first linear scale, and a head structure including a first scale head and a second scale head that are spaced apart from each other, wherein the head structure reads the first linear scale or the second linear scale while moving in the first direction, wherein the first scale head and the second scale head are activated or deactivated opposite to each other.

19 Claims, 11 Drawing Sheets

(56) References Cited

FOREIGN PATENT DOCUMENTS

| KR | 20160039033 A | * | 4/2016 |
|----|---------------|---|--------|
| KR | 10-2018-0001684 A | | 1/2018 |
| KR | 10-2019-0066903 A | | 6/2019 |
| KR | 10-2020-0040877 A | | 4/2020 |
| KR | 10-2020-0040878 A | | 4/2020 |

OTHER PUBLICATIONS

Communication dated Mar. 26, 2024 of the Chinese Patent Application No. 2021114476564, which corresponds to the above-identified application.

* cited by examiner

POSITION MEASURING DEVICE AND SUBSTRATE PROCESSING APPARATUS INCLUDING THE SAME

This application claims the benefit of Korean Patent Application No. 10-2020-0180038, filed on Dec. 21, 2020, in the Korean Intellectual Property Office, the disclosure of which is incorporated herein by reference in its entirety.

BACKGROUND

1. Field

The present invention relates to a position measuring device and a substrate processing apparatus including the same.

2. Description of the Related Art

To measure the position (or displacement) of a movable member, a linear scale may be used. As the linear scale, a material with low thermal deformation (e.g., glass ceramic) is used.

SUMMARY

By the way, in a substrate processing apparatus for producing a large-sized product (e.g., a large-sized display product), a fairly long (e.g., 3 m or more) linear scale is required. In order to increase the precision, linear scales are sometimes manufactured with special materials such as Zerodur. However, it is difficult to manufacture a linear scale longer than 3 m with these special materials.

An object of the present invention is to provide a position measuring device and a position measuring method for accurately measuring the position of a movable member using a plurality of linear scales.

Another object of the present invention is to provide a substrate processing apparatus, to which the position measuring device is applied.

The objects of the present invention are not limited to the objects mentioned above, and other objects not mentioned will be clearly understood by those skilled in the art from the following description.

One aspect of the position measuring device of the present disclosure for achieving the above object comprises a first linear scale elongated in a first direction; a second linear scale elongated in the first direction and separated from the first linear scale; and a head structure including a first scale head and a second scale head that are spaced apart from each other, wherein the head structure reads the first linear scale or the second linear scale while moving in the first direction, wherein the first scale head and the second scale head are activated or deactivated opposite to each other.

One aspect of the substrate processing apparatus of the present disclosure for achieving the above object comprises a base; a substrate support unit installed on an upper surface of the base and for supporting a substrate; a gantry installed to be spaced apart from an upper surface of the base; a movement path elongated in a first direction on one surface of the gantry; an inkjet head unit for discharging a droplet of chemical liquid to the substrate while moving along the movement path; and a first position measuring device for identifying a position of the inkjet head unit, wherein the first position measuring device comprises a first linear scale installed on one surface of the gantry and elongated in a first direction, a second linear scale elongated in the first direction and separated from the first linear scale, and a head structure including a first scale head and a second scale head that are spaced apart from each other, wherein, in response to the inkjet head unit moving in a first direction along the movement path, the head structure reads the first linear scale or the second linear scale while moving together with the inkjet head unit, wherein the first scale head and the second scale head are activated or deactivated opposite to each other.

One aspect of the position measuring method of the present disclosure for achieving the above object comprises providing a substrate processing apparatus including first and second linear scales that are separated from each other and elongated in a first direction, and a first scale head and a second scale head that are spaced apart from each other, wherein the first linear scale and the second linear scale are sequentially arranged in a line, and a first boundary portion is located between the first linear scale and the second linear scale, wherein, in response to the first scale head and the second scale head moving along the first direction, the second scale head follows the first scale head, wherein, in a state, in which the first scale head is activated and the second scale head is deactivated, the first scale head and the second scale head move along the first linear scale, wherein, in response to the first scale head passing the first boundary portion, the first scale head is deactivated and the second scale head is activated.

The details of other embodiments are included in the detailed description and drawings.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, preferred embodiments of the present invention will be described in detail with reference to the accompanying drawings. Advantages and features of the present invention and methods of achieving them will become apparent with reference to the embodiments described below in detail in conjunction with the accompanying drawings. However, the present invention is not limited to the embodiments described below, but may be implemented in various different forms, and these embodiments are provided only for making the description of the present invention complete and fully informing those skilled in the art to which the present invention pertains on the scope of the invention, and the present invention is only defined by the scope of the claims. Like reference numerals refer to like elements throughout.

Spatially relative terms "below," "beneath," "lower," "above," and "upper" can be used to easily describe a correlation between an element or components and other elements or components. The spatially relative terms should be understood as terms including different orientations of the device during use or operation in addition to the orientation shown in the drawings. For example, when an element shown in the figures is turned over, an element described as "below" or "beneath" another element may be placed "above" the other element. Accordingly, the exemplary term "below" may include both directions below and above. The device may also be oriented in other orientations, and thus spatially relative terms may be interpreted according to orientation.

Although first, second, etc. are used to describe various elements, components, and/or sections, it should be understood that these elements, components, and/or sections are not limited by these terms. These terms are only used to distinguish one element, component, or section from another element, component, or section. Accordingly, the first element, the first component, or the first section mentioned below may be the second element, the second component, or the second section within the technical spirit of the present invention.

Figure 1:
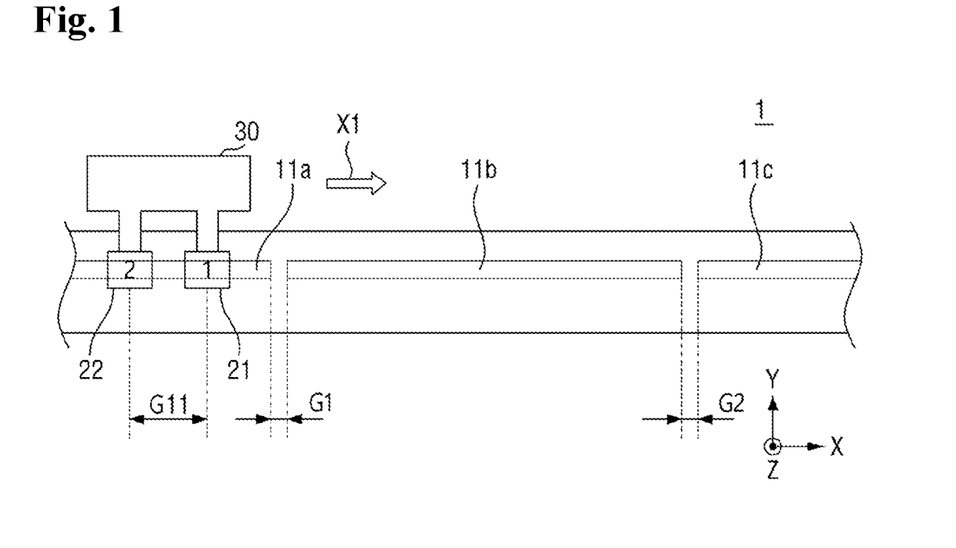
FIG. 1 is a conceptual diagram for describing a position measuring device according to an embodiment of the present disclosure.

FIG. 1 is a conceptual diagram for describing a position measuring device according to an embodiment of the present disclosure.

Referring to FIG. 1, the position measuring device 1 according to an embodiment of the present disclosure includes a plurality of linear scales 11a, 11b, 11c, and a head structure 30.

The plurality of linear scales 11a, 11b, and 11c include, for example, a first linear scale 11a, a second linear scale 11b, and a third linear scale 11c.

Each of the linear scales 11a, 11b, and 11c is elongated in the first direction X. In addition, the first linear scale 11a, the second linear scale 11b, and the third linear scale 11c are arranged to be adjacent to each other in the first direction X. For example, the short side of the first linear scale 11a and the short side of the second linear scale 11b may be arranged to face each other, and the short side of the second linear scale 11b and the short side of the third linear scale 11c may be arranged to face each other.

The head structure 30 includes a plurality of scale heads 21 and 22 that are spaced apart from each other. The plurality of scale heads 21 and 22 include, for example, a first scale head 21 and a second scale head 22. As illustrated, the first scale head 21 and the second scale head 22 may be arranged to be spaced apart from each other in the first direction X.

The head structure 30 may be installed on the movable member to move together with the movable member (not shown), or may be a part of the movable member. When the head structure 30 moves, for example, in the X1 direction, the first scale head 21 and the second scale head 22 may read the plurality of linear scales 11a, 11b, and 11c. For example, fine scales are formed on the linear scales 11a, 11b, and 11c, and the scale heads 21 and 22 irradiate light to the linear scales 11a, 11b, and 11c to read the scales, thereby identifying the position (or displacement) of a head structure 30 (i.e., the movable member). The configuration of the linear scales 11a, 11b, and 11c and the reading method of the scale heads 21 and 22 are not limited to those described above. Any structure and/or reading method capable of identifying the position of the movable member may be used.

On the other hand, adjacent linear scales (e.g., 11a, 11b) are spaced apart from each other, so that there may be a first gap G1 between adjacent linear scales (e.g., 11a, 11b), and there may be a second gap G2 between adjacent linear scales (e.g., 11b and 11c). Also, there is a separation distance G11 between the scale heads 21 and 22, and the separation distance G11 may be greater than the length of the first gap G1 or the second gap G2.

In the position measuring device 1 according to an embodiment of the present disclosure, in a state, in which all of the plurality of scale heads 21 and 22 are continuously activated, the corresponding linear scale (e.g., 11a) is not read.

For example, the first scale head 21 and the second scale head 22 are activated or deactivated opposite to each other. When the first scale head 21 is activated to perform a read operation, the second scale head 22 is deactivated. Also, when the second scale head 22 is activated to perform a read operation, the first scale head 21 is deactivated.

More specifically, when the second scale head 22 moves after the first scale head 21, in a state where the first scale head 21 is activated and the second scale head 22 is deactivated, when the first scale head 21 passes the first preset position, the first scale head 21 is deactivated and the second scale head 22 is activated. Then, in a state where the first scale head 21 is deactivated and the second scale head 22 is activated, when the first scale head 21 at the front passes the second preset position, the first scale head 21 may be activated again and the second scale head 22 may be deactivated again.

Here, it has described that, depending on whether the first scale head 21 passes the preset position (i.e., the first preset position, the second preset position), the activation/inactivation of the first and second scale heads 21 are 22 are switched, but the present disclosure is not limited thereto. For example, whether the second scale head 22 passes a preset position may be used, or whether the first and second scale heads 22 pass a preset position may be used.

The operations of the first scale head 21 and the second scale head 22 will be described in detail with reference to FIGS. 2 to 4.

Figure 2:
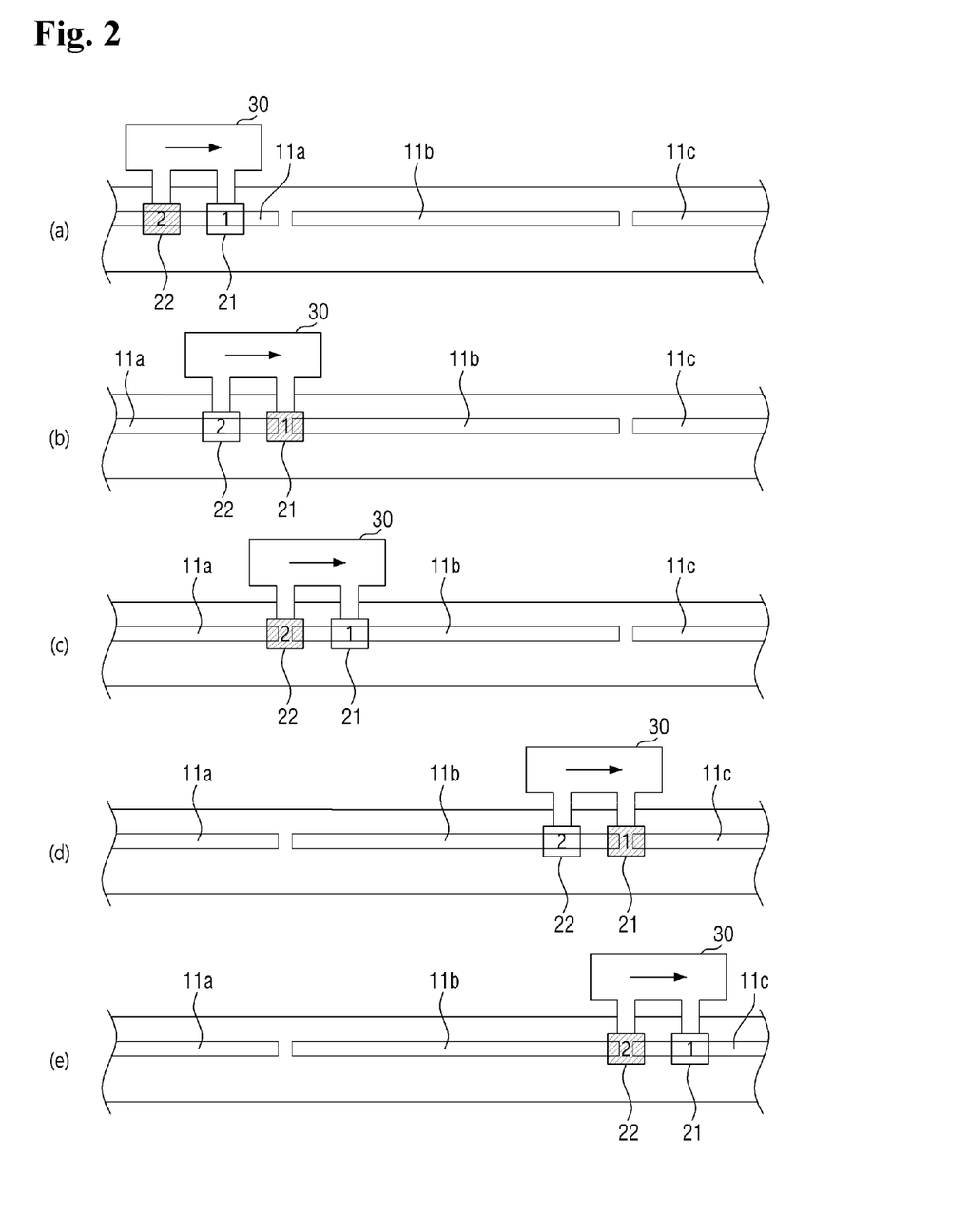
FIG. 2 is a view for describing a position measuring method according to an embodiment of the present disclosure.

FIG. 2 is a view for describing a position measuring method according to an embodiment of the present disclosure.

Referring to FIG. 2(a), when the head structure 30 moves in the first direction X, the first scale head 21 is located at the front and the second scale head 22 is located at the rear. That is, the second scale head 22 follows the first scale head 21.

The first scale head 21 and the second scale head 22 move along the first linear scale 11a (or above the first linear scale 11a). The first scale head 21 located at the front reads the first linear scale 11a in an activated state. On the other hand, the second scale head 22 located at the rear is in a deactivated state.

Referring to FIG. 2(b), the first scale head 21 arrives at a first boundary portion between the first linear scale 11a and the second linear scale 11b. Here, the first boundary portion means a first gap (see G1 in FIG. 1) between the first linear scale 11a and the second linear scale 11b and/or a vicinity of the first gap G1.

When the first scale head 21 reaches at the first boundary portion, the first scale head 21 is deactivated, and the second scale head 22 is activated to read the first linear scale 11a.

Depending on the operation setting, the first scale head 21 may be deactivated from the time point when the first scale head 21 meets the first gap G1, or the first scale head 21 may be deactivated before the first scale head 21 meets the first gap G1 (e.g., from 0.1 m before meeting the first gap G1).

Specifically, for example, it is assumed that the first linear scale 11a is 3 m and the first gap G1 is 0.1 m. While the first scale head 21 is on the upper side of the first linear scale 11a (i.e., see FIG. 2(a)), the controller uses the position (or scale) where the first scale head 21 reads to identify the position of the movable member.

However, since the first scale head 21 cannot read the scale while the first scale head 21 is located on the upper side of the first gap G1, the controller cannot use the first scale head 21. Since the controller already knows the length of the separation distance (see G11 in FIG. 1) between the first scale head 21 and the second scale head 22, it identifies the position of the movable member by adding the length of the separation distance G11 to the position (or scale) where the second scale head 22 reads. For example, if the length of the separation distance G11 is 0.2 m and the position where the second scale head 22 reads is 2.95 m, the position of the movable member is identified as 3.15 m.

Referring to FIG. 2(c), when the second scale head 22 reaches the first boundary portion, the second scale head 22 is deactivated and the first scale head 21 is activated again. The first scale head 21 reads the second linear scale 11b.

Referring to FIG. 2(d), the first scale head 21 reaches a second boundary portion between the second linear scale 11b and the third linear scale 11c. Here, the second boundary portion means a gap between the second linear scale 11b and the third linear scale 11c and/or the vicinity of the gap.

When the first scale head 21 reaches the second boundary portion, the first scale head 21 is deactivated, and the second scale head 22 is activated to read the second linear scale 11b. As described above, the controller identifies the position of the movable member by adding the separation distance G11 to the position (or scale) where the second scale head 22 reads.

Referring to FIG. 2(e), when the second scale head 22 reaches the second boundary portion, the second scale head 22 is deactivated, and the first scale head 21 is activated again to read the third linear scale 11c.

Figure 3:
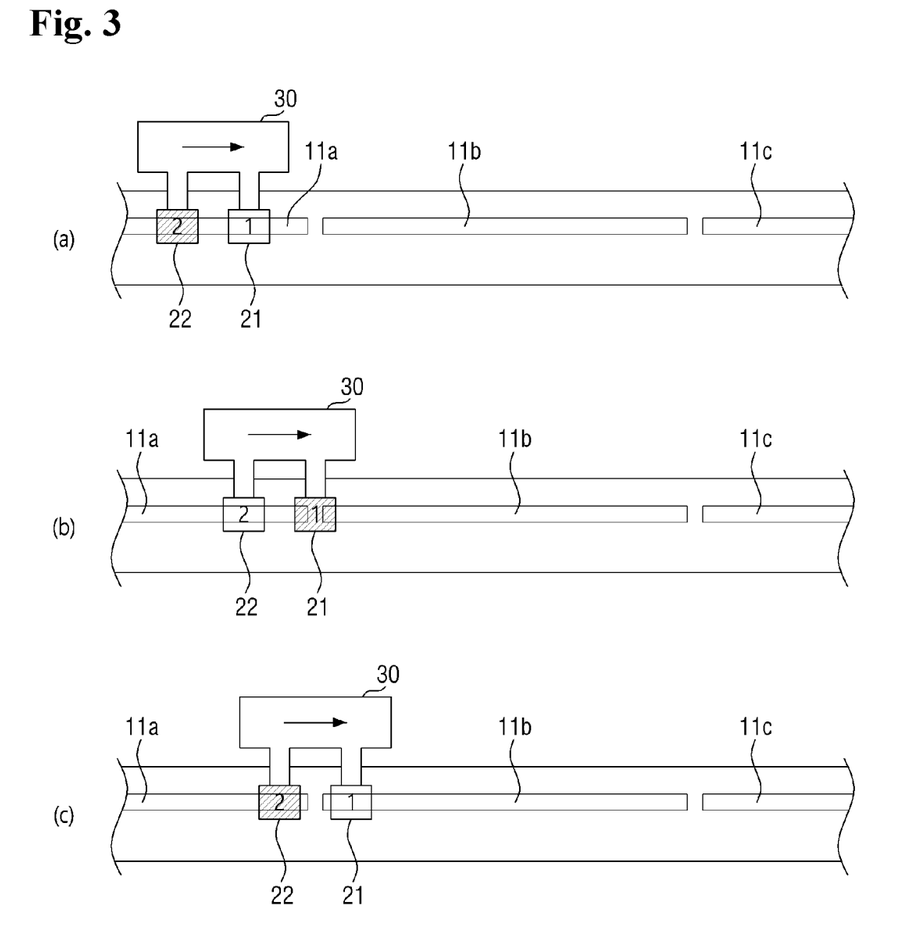
FIG. 3 is a view for describing a position measuring method according to another embodiment of the present disclosure.

FIG. 3 is a view for describing a position measuring method according to another embodiment of the present disclosure. Hereinafter, for convenience of description, those substantially the same as those described with reference to FIGS. 1 and 2 will be omitted.

Referring to FIG. 3(a), when the head structure 30 moves in the first direction X, the first scale head 21 is located at the front and the second scale head 22 is located at the rear. That is, the second scale head 22 follows the first scale head 21.

Referring to FIG. 3(b), the first scale head 21 reaches a first boundary portion between the first linear scale 11a and the second linear scale 11b. While the first scale head 21 passes the first boundary portion, the first scale head 21 is deactivated and the second scale head 22 is activated. The controller identifies the position of the movable member by adding the separation distance G11 to the position (or scale) where the second scale head 22 reads.

Referring to FIG. 3(c), after the first scale head 21 passes the first boundary portion, the first scale head 21 is activated again and the second scale head 22 is deactivated again. That is, even if the second scale head 22 does not reach the first boundary portion, when the first scale head 21 passes the first boundary portion, the controller uses the first scale head 21 to identify the position of the movable member.

In summary, when making a linear scale with a special material, it is difficult to manufacture a linear scale longer than 3 m. Accordingly, in the position measuring device according to some embodiments of the present disclosure, when displacement measurement of 3 m or more is required, a plurality of linear scales (e.g., 11a, 11b, 11c) are arranged in a line and used. In this case, a gap (e.g., G1) exists between adjacent linear scales (e.g., 11a, 11b). By using a plurality of scale heads 21, 22, the scale heads located in the gap G1 (e.g., 21) are deactivated, and the scale heads not located in the gap G1 (e.g., 22) are activated to prevent omission of position measurement that may occur in the gap G1.

Figure 4:
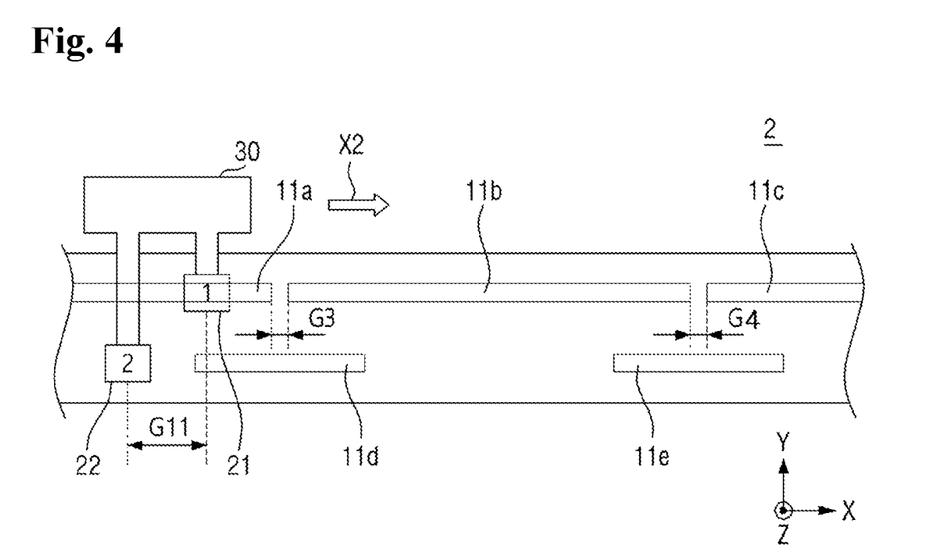
FIG. 4 is a conceptual diagram for describing a position measuring device according to another embodiment of the present disclosure.

FIG. 4 is a conceptual diagram for describing a position measuring device according to another embodiment of the present disclosure. Hereinafter, for convenience of description, those substantially the same as those described with reference to FIG. 1 will be omitted.

Referring to FIG. 4, the position measuring device 2 according to another embodiment of the present disclosure includes a plurality of linear scales 11a, 11b, 11c, 11d and 11e, and a head structure 30.

The plurality of linear scales 11a, 11b, 11c, 11d, and 11e include, for example, a first linear scale 11a, a second linear scale 11b, a third linear scale 11c, a fourth linear scale 11d, and a fifth linear scale 11e.

Each of the linear scales 11a, 11b, 11c, 11d, and 11e is elongated in the first direction X. In addition, the first linear scale 11a, the second linear scale 11b, and the third linear scale 11c are arranged in a line. In addition, the fourth linear scale 11d and the fifth linear scale 11e are arranged in a line. As illustrated, the first to third linear scales 11a, 11b, and 11c and the fourth and fifth linear scales 11d and 11e are spaced apart from each other in the second direction Y.

In particular, there is a third gap G3 between the first linear scale 11a and the second linear scale 11b, and there is a fourth gap G4 between the second linear scale 11b and the third linear scale 11c. The fourth linear scale 11d is arranged to overlap the third gap G3 in the second direction Y, and the fifth linear scale 11e is arranged to overlap the fourth gap G4 in the second direction Y.

The head structure 30 includes a plurality of scale heads 21 and 22 spaced apart from each other. The plurality of scale heads 21 and 22 include, for example, a first scale head 21 and a second scale head 22. The first scale head 21 and the second scale head 22 may be arranged to be spaced apart from each other in the first direction X and the second direction Y.

The head structure 30 may be installed on the movable member to move together with the movable member (not shown), or may be a part of the movable member. When the head structure 30 moves, for example, in the X2 direction, the first scale head 21 in the activated state reads the corresponding linear scales 11a, 11b, 11c, and the second scale head 22 in the activated state reads the corresponding linear scales 11d and 11e.

In the position measuring device 2 according to another embodiment of the present disclosure, the plurality of scale heads 21 and 22 do not read the corresponding linear scale (e.g., 11a) in the continuously activated state.

For example, the first scale head 21 and the second scale head 22 may be activated or deactivated opposite to each other.

More specifically, in a case that the second scale head 22 moves after the first scale head 21, in a state, in which the first scale head 21 is activated and the second scale head 22 is deactivated, when the first scale head 21 passes the first preset position, the first scale head 21 is deactivated and the second scale head 22 is activated. Subsequently, in a state, in which the first scale head 21 is deactivated and the second scale head 22 is activated, when the first scale head 21 passes the second preset position, the first scale head 21 may be activated again and the second scale head 22 may be deactivated again.

However, when viewed in the second direction Y, a part of the first linear scale (e.g., 11a) and a part of the fourth linear scale (e.g., 11d) may overlap. Depending on the design, in the overlapping section, only the first scale head 21 may be activated, only the second scale head 22 may be activated, or both the first and second scale heads 21 and 22 may be activated.

The operations of the first scale head 21 and the second scale head 22 will be described in detail with reference to FIG. 5.

Figure 5:
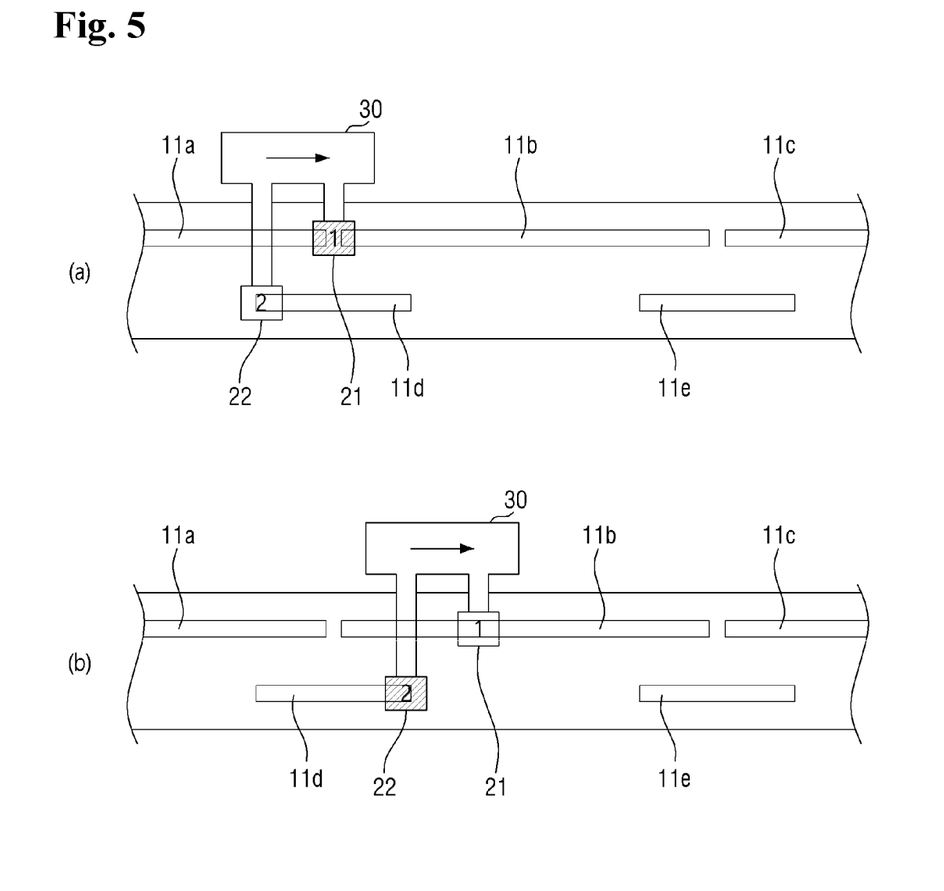
FIG. 5 is a view for describing a position measuring method according to another embodiment of the present disclosure.

FIG. 5 is a view for describing a position measuring method according to another embodiment of the present disclosure.

Referring to FIG. 5(a), when the head structure 30 moves in the first direction X, the first scale head 21 is located at the front and the second scale head 22 is located at the rear. The first scale head 21 moves along the first linear scale 11a (or on the upper side of the first linear scale 11a). The first scale head 21 reads the first linear scale 11a in an activated state. On the other hand, the second scale head 22 is in a deactivated state.

Here, the first scale head 21 reaches the third boundary portion. The third boundary portion means a third gap between the first linear scale 11a and the second linear scale 11b (see G3 in FIG. 4) and/or a vicinity of the third gap G3.

When the first scale head 21 reaches the third boundary portion, the first scale head 21 is deactivated, and the second scale head 22 is activated to read the fourth linear scale 11d. In order to enable such a read operation, the length and position of the fourth linear scale 11d should be determined in consideration of the separation distance G11 between the first scale head 21 and the second scale head 22. That is, the fourth linear scale 11d should be installed at least in front of the separation distance G11 from the third boundary portion.

Referring to FIG. 5(b), when the second scale head 22 reaches the end point of the fourth linear scale 11d, the second scale head 22 is deactivated and the first scale head 21 is activated again. The first scale head 21 reads the second linear scale 11b to identify the position of the movable member.

Contrary to the illustration, even if the second scale head 22 does not reach the end point of the fourth linear scale 11d, when the first scale head 21 passes the third boundary portion, the controller may use the first scale head 21 to identify the position of the movable member.

Figure 6:
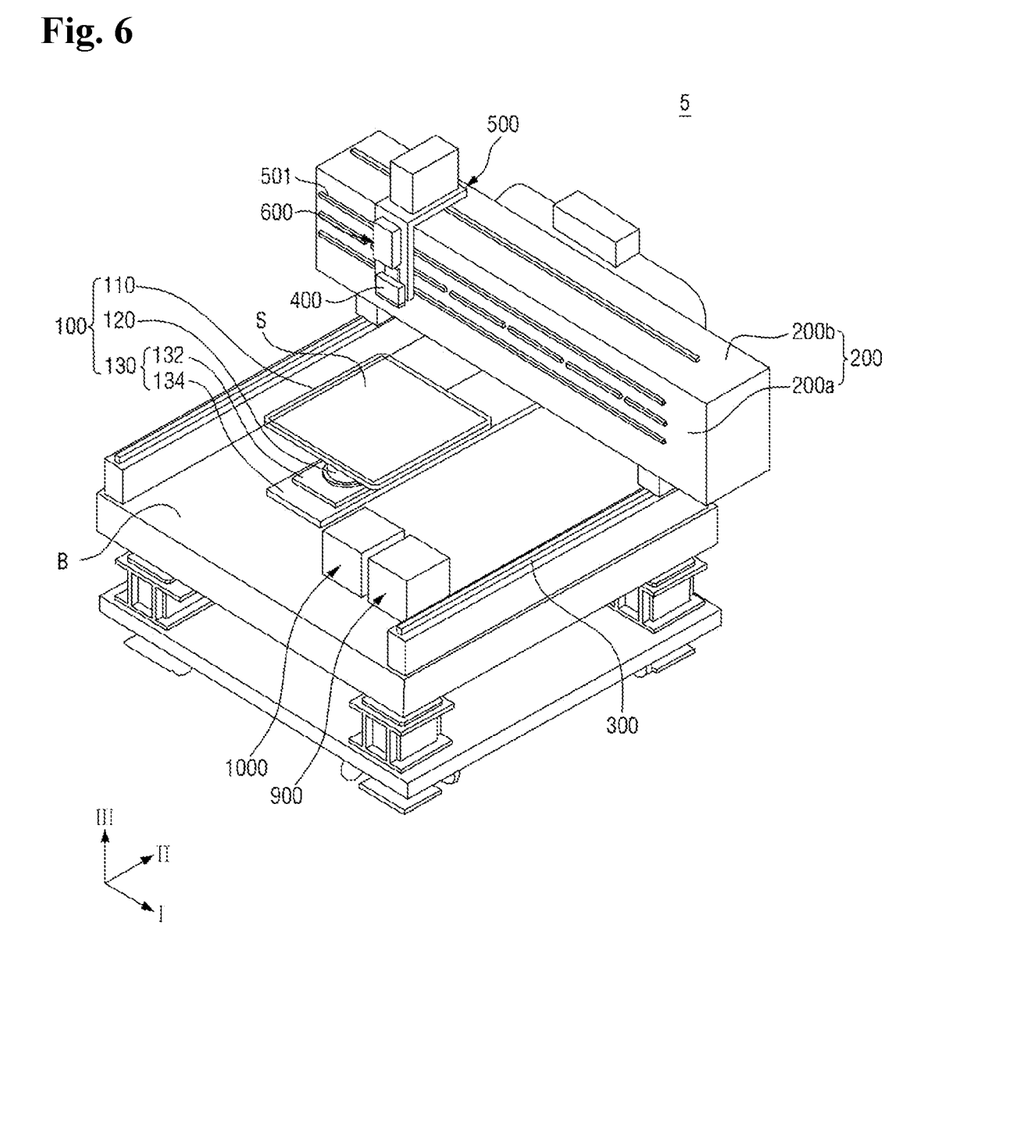
FIG. 6 is a perspective view for describing a substrate processing apparatus according to an embodiment of the present disclosure.
Figure 7:
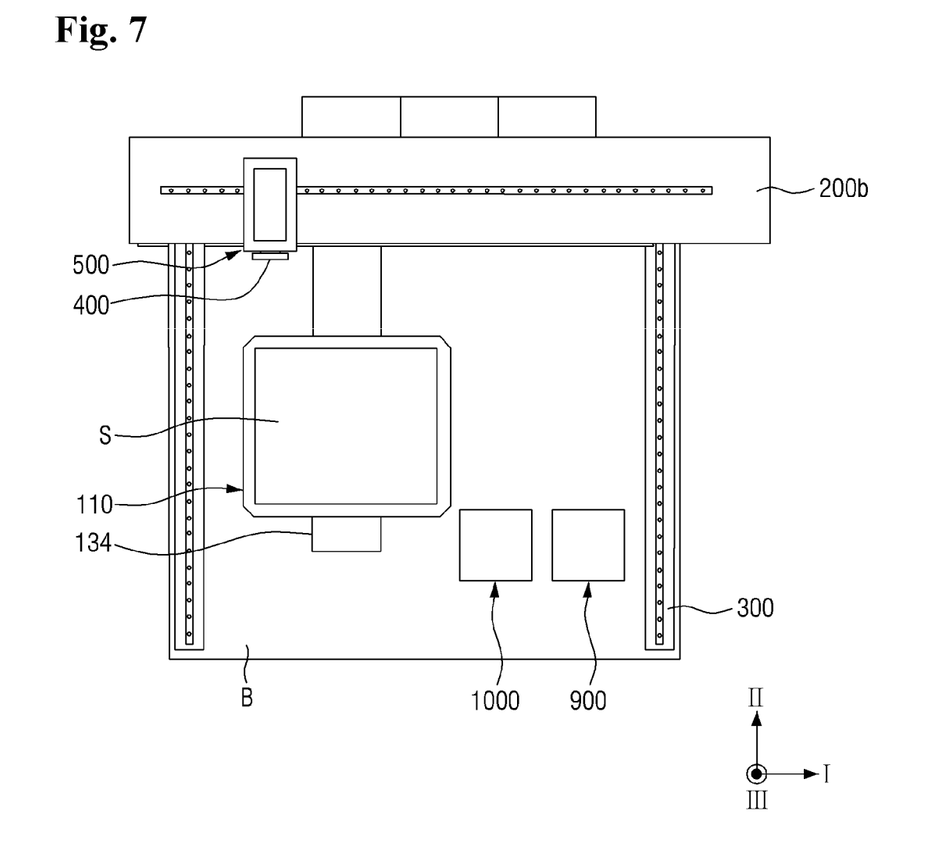
FIG. 7 is a plan view for describing a substrate processing apparatus according to an embodiment of the present disclosure.
Figure 8:
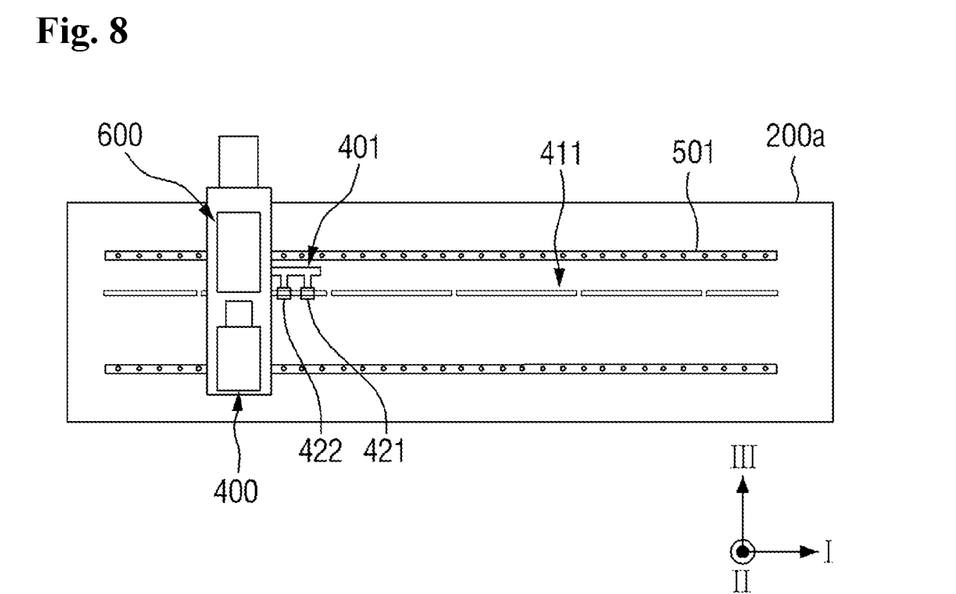
FIG. 8 is a view for describing the inkjet head unit and the position measuring device shown in FIG. 6.
Figure 9:
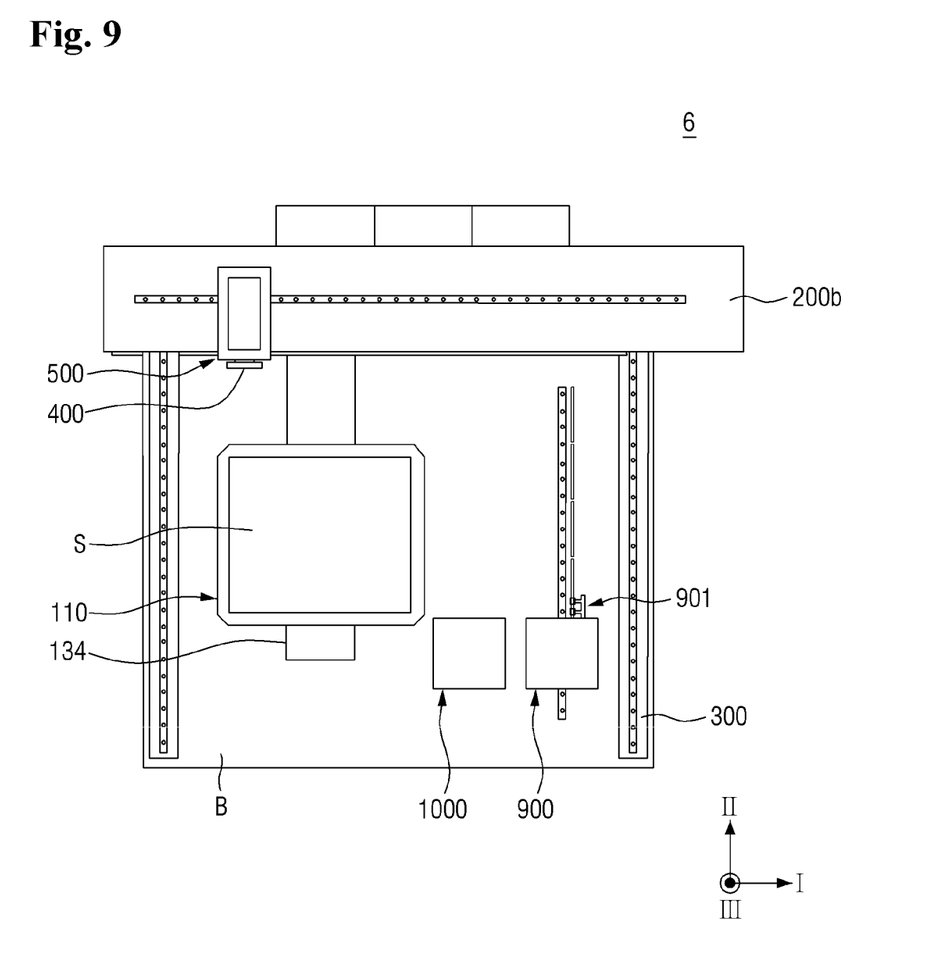
FIG. 9 is a plan view for describing a substrate processing apparatus according to another embodiment of the present disclosure.
Figure 10:
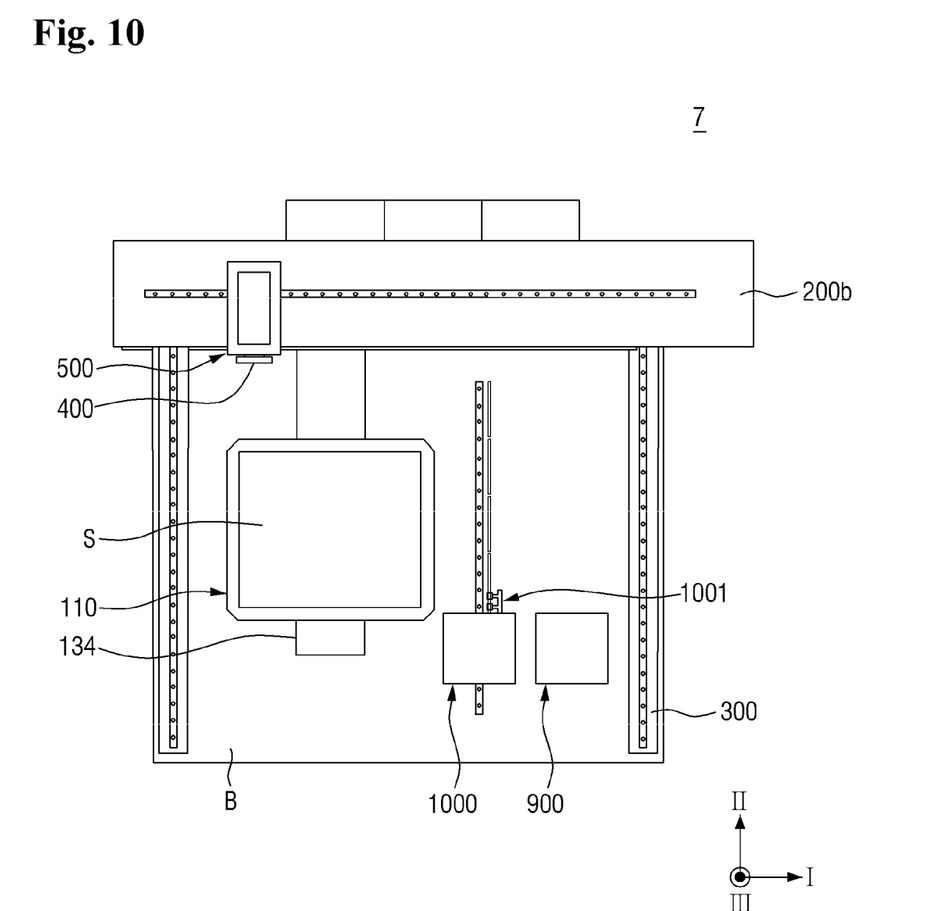
FIG. 10 is a plan view for describing a substrate processing apparatus according to another embodiment of the present disclosure.
Figure 11:
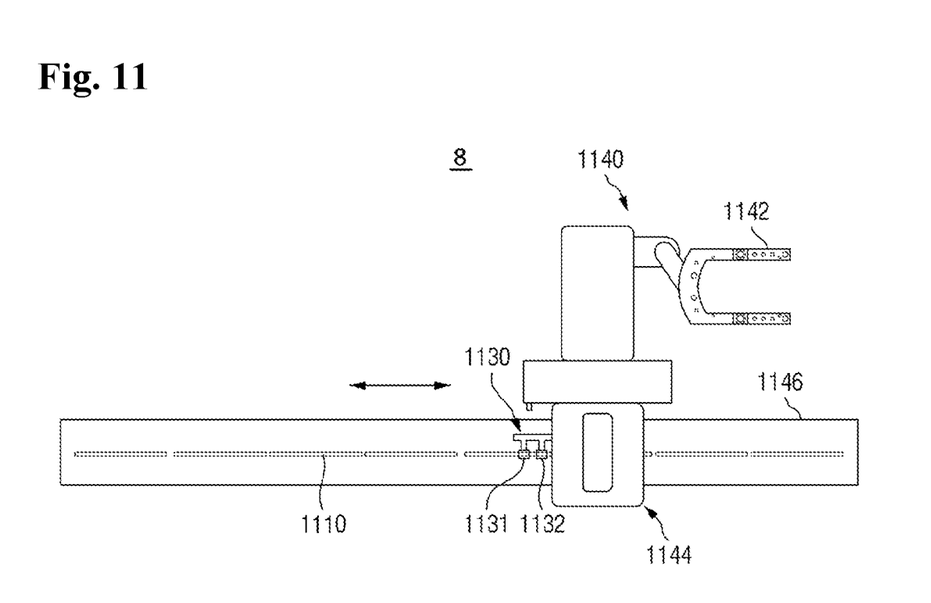
FIG. 11 is a view for describing a substrate processing apparatus according to another embodiment of the present disclosure.

Hereinafter, an example, in which the position measuring device described with reference to FIGS. 1 to 5 is applied, will be described. FIGS. 6 to 8 are examples, in which it is applied to an inkjet head unit, FIG. 9 is an example, in which it is applied to a nozzle inspection unit, and FIG. 10 is an example, in which it is applied to a head cleaning unit. FIG. 11 is an example, in which it is applied to a transfer module.

FIGS. 6 and 7 are perspective views and plan views, respectively, for describing a substrate processing apparatus according to an embodiment of the present disclosure. FIG. 8 is a view for describing the inkjet head unit and the position measuring device shown in FIG. 6.

Referring to FIGS. 6 and 7, a substrate processing apparatus 5 according to an embodiment of the present disclosure includes a base B, a substrate support unit 100, a gantry 200, a gantry moving unit 300, an inkjet head unit 400, a head moving unit 500, a chemical liquid supply unit 600, a nozzle inspection unit 900, a head cleaning unit 1000, and a first scale unit 401.

The base B may be provided in a rectangular parallelepiped shape having a constant thickness. The substrate support unit 100 is arranged on the upper surface of the base B. The substrate support unit 100 has a support plate 110, on which the substrate S is placed. The support plate 110 may be a plate having a rectangular shape. A rotation driving member 120 is connected to the lower surface of the support plate 110. The rotation driving member 120 may be a rotation motor. The rotation driving member 120 rotates the support plate 110 with respect to a rotation center axis perpendicular to the support plate 100. When the support plate 110 is rotated by the rotation driving member 120, the substrate S may be rotated by the rotation of the support plate 110.

The support plate 110 and the rotation driving member 120 may be linearly moved in the second direction II by the linear driving member 130. The linear driving member 130 includes a slider 132 and a guide member 134. The rotation driving member 120 is installed on the upper surface of the slider 132. The guide member 134 is elongated in the second direction II on the center of the upper surface of the base B. A linear motor (not shown) may be embedded in the slider 132, and the slider 132 is linearly moved in the second direction II along the guide member 134 by the linear motor (not shown).

The gantry 200 is provided above the path along which the support plate 110 is moved. The gantry 200 is arranged upwardly spaced apart from the upper surface of the base B, and the gantry 200 is arranged so that its longitudinal direction faces the first direction I. The inkjet head unit 400 is coupled to the gantry 200 by a head moving unit 500. The inkjet head unit 400 may move linearly in the longitudinal direction of the gantry, that is, in the first direction I by the head moving unit 500. Optionally, it may also be linearly moved in the third direction III. The inkjet head unit 400 receives a chemical liquid (or liquid crystal) by the chemical liquid supply unit 600. In addition, a rail 501 for moving the inkjet head unit 400 and the head moving unit 500 in the first direction I is installed on the upper surface 200b and/or the side surface 200a of the gantry 200. Although the rail 501 is illustrated as an example of the movement path of the inkjet head unit 400 and the head moving unit 500, it is not limited thereto. Any method for moving the inkjet head unit 400 and the head moving unit 500 may be used.

Meanwhile, although the gantry 200 is illustrated as being moved in the second direction II by the gantry moving unit 300, it is not limited thereto. Depending on the design, the gantry 200 may be fixed.

The nozzle inspection unit 900 may be arranged on one side of the substrate support unit 100 on the base B. The nozzle inspection unit 900 determines whether at least one individual nozzle of the inkjet head unit 400 is abnormal through an optical inspection. For example, the chemical liquid (liquid crystal) discharge amount measurement unit (not shown) measures the chemical liquid discharge amount as a whole, and if it is determined that there is an abnormality, the nozzle inspection unit 900 may determine whether there is abnormality in at least one individual nozzle of the inkjet head unit 400.

The head cleaning unit 1000 may be arranged on one side of the substrate support unit 100 on the base B. The head cleaning unit 1000 performs a purging process and a suction process. The purging process is a process of injecting a portion of the liquid crystal accommodated in the inkjet head unit 400 at a high pressure. The suction process is a process of sucking and removing the liquid crystal remaining on the nozzle surface of the inkjet head unit 400 after the purging process.

Here, referring to FIG. 8, a rail 501 for moving the inkjet head unit 400 and the head moving unit 500 in the first direction I is elongated in the first direction I, and is installed on the side surface 200a of the gantry 200.

The first position measuring device 401 is for identifying the position of the inkjet head unit 400, and includes a plurality of linear scales 411, a first scale head 421, and a second scale head 422. In FIG. 8, the shape of the position measuring device 401 is shown to be substantially the same as that of the position measuring device 1 of FIG. 1, but the present disclosure is not limited thereto. For example, the first scale head 421 may be arranged on one side (e.g., the right side) of the inkjet head unit 400, and the second scale head 422 may be arranged on the other side (e.g., the left side) of the inkjet head unit 400. Alternatively, it may have substantially the same shape as the position measuring device 2 of FIG. 4.

An operation method of the first position measuring device 401 is substantially the same as that described with reference to FIGS. 1 to 5.

For example, when the inkjet head unit 400 moves in the first direction I along the rail 501, the plurality of scale heads 421 and 422 move together with the inkjet head unit and read the plurality of linear scales 411, but the plurality of scale heads 421 and 422 are activated or deactivated opposite to each other.

Specifically, the plurality of linear scales 411 include a first linear scale and a second linear scale that are sequentially arranged in a line. A first boundary portion is located between the first linear scale and the second linear scale. In a state, in which the first scale head 421 is activated and the second scale head 422 is deactivated, the first scale head 421 and the second scale head 422 move along the first linear scale.

While the first scale head 421 passes the first boundary portion, the first scale head 421 is deactivated and the second scale head 422 is activated. After the first scale head 421 passes the first boundary portion, the first scale head 421 may be activated again and the second scale head 422 may be deactivated again.

Alternatively, when the first scale head 421 passes the first boundary portion, the first scale head 421 may be deactivated, the second scale head 422 may be activated, and when the second scale head 422 passes the first boundary portion, the first scale head 421 may be activated again and the second scale head 422 may be deactivated again.

FIG. 9 is a plan view for describing a substrate processing apparatus according to another embodiment of the present disclosure. For convenience of description, the points different from those described with reference to FIGS. 6 to 8 will be mainly described.

Referring to FIG. 9, in the substrate processing apparatus 6 according to another embodiment of the present disclosure, the nozzle inspection unit 900 may move in the second direction II. The second position measuring device 901 is for identifying the position of the nozzle inspection unit 900 and includes a plurality of linear scales and a plurality of scale heads. The linear scales may be arranged in a line next to the movement path (e.g., rail) of the nozzle inspection unit 900 on the base B, and a plurality of scale heads may be installed in the body of the nozzle inspection unit 900. However, the present disclosure is not limited thereto. While the plurality of scale heads move along the plurality of linear scales, at a preset first position, some scale heads may be deactivated, and some other scale heads may be activated, and at a preset second position, the some scale heads may be activated again and the some other scale heads may be deactivated again.

FIG. 10 is a plan view for describing a substrate processing apparatus according to another embodiment of the present disclosure. For convenience of description, the points different from those described with reference to FIGS. 6 to 8 will be mainly described.

Referring to FIG. 10, in the substrate processing apparatus 7 according to another embodiment of the present disclosure, the head cleaning unit 1000 may move in the second direction II. The third position measuring device 1001 is for identifying the position of the head cleaning unit 1000 and includes a plurality of linear scales and a plurality of scale heads. The linear scales may be arranged in a line next to the movement path (e.g., rail) of the head cleaning unit 1000 on the base B, and a plurality of scale heads may be installed in the body of the head cleaning unit 1000. However, the present disclosure is not limited thereto. While the plurality of scale heads move along the plurality of linear scales, at a preset third position, some scale heads may be deactivated, some other scale heads may be activated, and at a preset fourth position, the some scale heads may be activated again and the some other scale heads may be deactivated again.

Meanwhile, although not shown separately in the drawings, the gantry 200 is fixed and the substrate support unit 100 (i.e., the support plate 110) moves along the second direction II, and the fourth position measuring device is installed in the peripheral of the substrate support unit 100 to identify the position of the support plate 110. The fourth position measuring device includes a plurality of linear scales and a plurality of scale heads. The linear scales may be arranged in a line next to the movement path of the support plate 110, and a plurality of scale heads may be installed in the support plate 110, but is not limited thereto. While the plurality of scale heads move along the plurality of linear scales, at a preset fifth position, some scale heads may be deactivated, some other scale heads may be activated, and at a preset sixth position, some scale heads may be activated again and the some other scale heads may be deactivated again.

FIG. 11 is a view for describing a substrate processing apparatus according to another embodiment of the present disclosure. For convenience of description, those substantially the same as those described with reference to FIGS. 6 to 10 will be omitted.

Referring to FIG. 11, a substrate processing apparatus 8 according to another embodiment of the present disclosure may be a transfer module for moving a substrate.

The main transfer robot 1140 includes a transfer hand 1142 and a horizontal driving unit 1144. The horizontal driving unit 1144 may move linearly along the transfer rail 1146. Although not shown, a separate vertical and rotation driving unit is further installed, so that the transfer hand 1142 may perform a vertical or rotation operation.

The fifth position measuring device 1130 may identify the position of the main transfer robot 1140. The fifth position measuring device includes a plurality of linear scales 1110 and a plurality of scale heads 1131 and 1132. A plurality of linear scales 1110 may be arranged in a line on the transfer rail 1146, and the plurality of scale heads 1131 and 1132 may be installed in the horizontal driving unit 1144 of the main transfer robot 1140, but is not limited thereto. While the plurality of scale heads 1131 and 1132 moves along the plurality of linear scales 1110, at a preset seventh position, some scale heads may be deactivated and some other scale heads may be activated, and at a preset eighth position, the some scale heads may be activated again and the some other scale heads may be deactivated again.

Although embodiments of the present invention have been described with reference to the above and the accompanying drawings, those of ordinary skill in the art to which the present invention pertains can understand that the present disclosure could be practiced in other specific forms without changing its technical spirit or essential features. Therefore, it should be understood that the embodiments described above are illustrative in all respects and not limiting.

What is claimed is:

1. An apparatus for measuring a position comprising:
a first linear scale elongated in a first direction;
a second linear scale elongated in the first direction and separated from the first linear scale; and
a head structure including a first scale head and a second scale head that are spaced apart from each other,
wherein the head structure reads the first linear scale or the second linear scale while moving in the first direction,
wherein the first scale head and the second scale head are activated or deactivated opposite to each other at all times when the first scale head or the second scale head are operating.

2. The apparatus of claim 1, wherein the second scale head follows the first scale head in response to the head structure moving in the first direction.

3. The apparatus of claim 2, wherein, in a state, in which the first scale head is activated and the second scale head is deactivated, in response to the first scale head passing a first preset position, the first scale head is deactivated and the second scale head is activated.

4. The apparatus of claim 3, wherein, in a state, in which the first scale head is deactivated and the second scale head is activated, in response to the first scale head passing a second preset position different from the first preset position, the first scale head is activated again and the second scale head is deactivated again.

5. The apparatus of claim 1, wherein the first linear scale and the second linear scale are sequentially arranged in a line, and a first boundary portion is located between the first linear scale and the second linear scale,
wherein, in a state, in which the first scale head is activated and the second scale head is deactivated, the first scale head and the second scale head move along the first linear scale, and the second scale head follows the first scale head.

6. The apparatus of claim 5, wherein, in response to the first scale head passing the first boundary portion, the first scale head is deactivated and the second scale head is activated, and then in response to the second scale head passing the first boundary portion, the first scale the head is activated again and the second scale head is deactivated again.

7. The apparatus of claim 5, wherein, while the first scale head passes the first boundary portion, the first scale head is deactivated and the second scale head is activated,
wherein after the first scale head passes the first boundary portion, the first scale head is activated again and the second scale head is deactivated again.

8. The apparatus of claim 1 further comprises,
a third linear scale sequentially arranged in a line with the first linear scale, wherein a third boundary portion is located between the first linear scale and a fourth linear scale,
wherein the second linear scale is spaced apart from the first linear scale and the fourth linear scale in a second direction, and overlaps the third boundary portion in the second direction,
wherein the first scale head is capable of reading the first and fourth linear scales in an activated state,
wherein the second scale head is capable of reading the second linear scale in an activated state.

9. The apparatus of claim 8, wherein, while the first scale head passes the third boundary portion, the first scale head is deactivated and the second scale head is activated,
wherein, after the first scale head passes the third boundary portion, the first scale head is activated again and the second scale head is deactivated again.

10. The apparatus of claim 1, wherein a movement path of an inkjet head unit is installed on one side of a gantry,
wherein the first linear scale and the second linear scale are installed on one surface of the gantry.

11. An apparatus for processing a substrate comprising:
a base;
a substrate support unit installed on an upper surface of the base and for supporting a substrate;
a gantry installed to be spaced apart from an upper surface of the base;
a movement path elongated in a first direction on one surface of the gantry;
an inkjet head unit for discharging a droplet of chemical liquid to the substrate while moving along the movement path; and
a first position measuring device for identifying a position of the inkjet head unit, wherein the first position measuring device comprises a first linear scale installed on one surface of the gantry and elongated in a first direction, a second linear scale elongated in the first direction and separated from the first linear scale, and a head structure including a first scale head and a second scale head that are spaced apart from each other,
wherein, in response to the inkjet head unit moving in a first direction along the movement path, the head structure reads the first linear scale or the second linear scale while moving together with the inkjet head unit, wherein the first scale head and the second scale head are activated or deactivated opposite to each other at all times when the first scale head or the second scale head are operating.

12. The apparatus of claim 11, wherein the first linear scale and the second linear scale are sequentially arranged in a line, and a first boundary portion is located between the first linear scale and the second linear scale,
wherein, in a state, in which the first scale head is activated and the second scale head is deactivated, the first scale head and the second scale head move along the first linear scale, and the second scale head follows the first scale head.

13. The apparatus of claim 12, wherein, in response to the first scale head passing the first boundary portion, the first scale head is deactivated and the second scale head is activated, and then in response to the second scale head passing the first boundary portion, the first scale the head is activated again and the second scale head is deactivated again.

14. The apparatus of claim 12, wherein, while the first scale head passes the first boundary portion, the first scale head is deactivated and the second scale head is activated, wherein, after the first scale head passes the first boundary portion, the first scale head is activated again and the second scale head is deactivated again.

15. The apparatus of claim 11 further comprises,
a nozzle inspection unit installed on the base, wherein the nozzle inspection unit is movable in a second direction; and
a second position measuring device including a plurality of linear scales and a plurality of scale heads, and for identifying a position of the nozzle inspection unit,
wherein the plurality of linear scales are arranged in a line,
wherein, while the plurality of scale heads move along the plurality of linear scales, at a preset first position, some scale heads are deactivated and some other scale heads are activated, and at a preset second position, the some scale heads are activated again and the some other scale heads are deactivated again.

16. The apparatus of claim 11 further comprises
a head cleaning unit installed on the base, wherein the head cleaning unit is movable in a second direction; and
a second position measuring device including a plurality of linear scales and a plurality of scale heads, and for identifying a position of the head cleaning unit,
wherein the plurality of linear scales are arranged in a line,
wherein, while the plurality of scale heads move along the plurality of linear scales, at a preset first position, some scale heads are deactivated and some other scale heads are activated, and at a preset second position, the some scale heads are activated again and the some other scale heads are deactivated again.

17. The apparatus of claim 11 further comprises,
a second position measuring device including a plurality of linear scales and a plurality of scale heads, and for identifying a position of the substrate support unit,
wherein the substrate support unit is movable in a second direction,
wherein the plurality of linear scales are arranged in a line,
wherein, while the plurality of scale heads move along the plurality of linear scales, at a preset first position, some scale heads are deactivated and some other scale heads are activated, and at a preset second position, the some scale heads are activated again and the some other scale heads are deactivated again.

18. A method for measuring a position comprising:
providing a substrate processing apparatus including first and second linear scales that are separated from each other and elongated in a first direction, and a first scale head and a second scale head that are spaced apart from each other, wherein the first linear scale and the second linear scale are sequentially arranged in a line, and a first boundary portion is located between the first linear scale and the second linear scale,
wherein, in response to the first scale head and the second scale head moving along the first direction, the second scale head follows the first scale head,
wherein, in a state, in which the first scale head is activated and the second scale head is deactivated opposite to each other at all times when the first scale head or the second scale head are operating, the first scale head and the second scale head move along the first linear scale,
wherein, in response to the first scale head passing the first boundary portion, the first scale head is deactivated and the second scale head is activated.

19. The method of claim 18, wherein, after the first scale head passes the first boundary portion, the first scale head is activated again and the second scale head is deactivated again.

* * * * *